United States Patent [19]

Bacardit

[11] Patent Number: 4,693,123
[45] Date of Patent: Sep. 15, 1987

[54] ELECTRO-OPTICAL TORQUE SENSING DEVICE FOR AN ACTUATING MECHANISM

[75] Inventor: Juan S. Bacardit, Barcelona, Spain

[73] Assignee: Bendiberica S.A., Barcelona, Spain

[21] Appl. No.: 838,631

[22] Filed: Mar. 11, 1986

[30] Foreign Application Priority Data

Mar. 14, 1985 [ES] Spain ..................................... 541.703

[51] Int. Cl.⁴ .............................................. G01L 3/12
[52] U.S. Cl. ................................................. 73/862.33
[58] Field of Search ..................................... 73/862.33

[56] References Cited

U.S. PATENT DOCUMENTS

| | | | |
|---|---|---|---|
| 2,147,711 | 2/1939 | Martin | 73/862.33 |
| 3,111,028 | 11/1963 | Lebow | 73/862.33 |
| 3,580,352 | 5/1971 | Ritter et al. | 73/862.33 X |

OTHER PUBLICATIONS

R. W. Carson–"Optical Sensor Measures Torque Without Slip Rings", Product Engineering, 10/1967, reprint, 4 pages.

Primary Examiner—Charles A. Ruehl
Attorney, Agent, or Firm—Larry J. Palguta; Ken C. Decker

[57] ABSTRACT

The torque sensor comprises first (11) and second rotary structures coupled respectively for rotation to first (5) and second (4) coaxial rotary members mutually coupled by a dead-travel resilient coupling (6), the rotary structures having adjacent zones each formed with a series of angularly spaced optical windows (13, 14) arranged to cross a light path, two corresponding windows belonging to each series being in partial overlapping relationship in the light path when the rotary members are in a relative neutral position.

7 Claims, 9 Drawing Figures

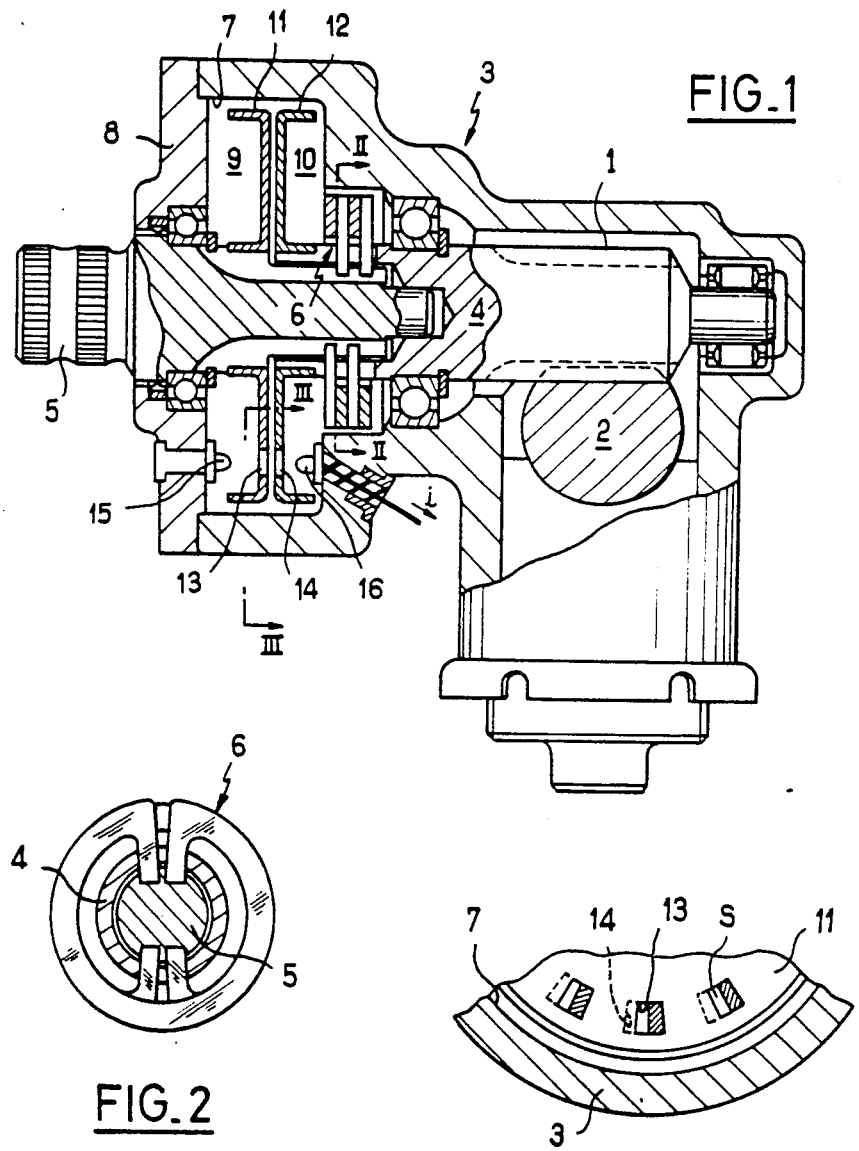
FIG.1
FIG.2
FIG.3
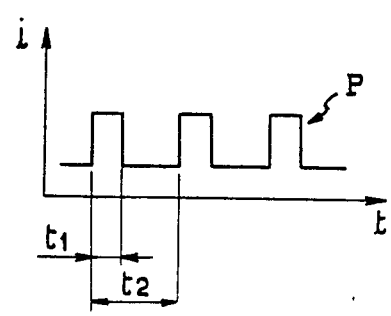
FIG.4

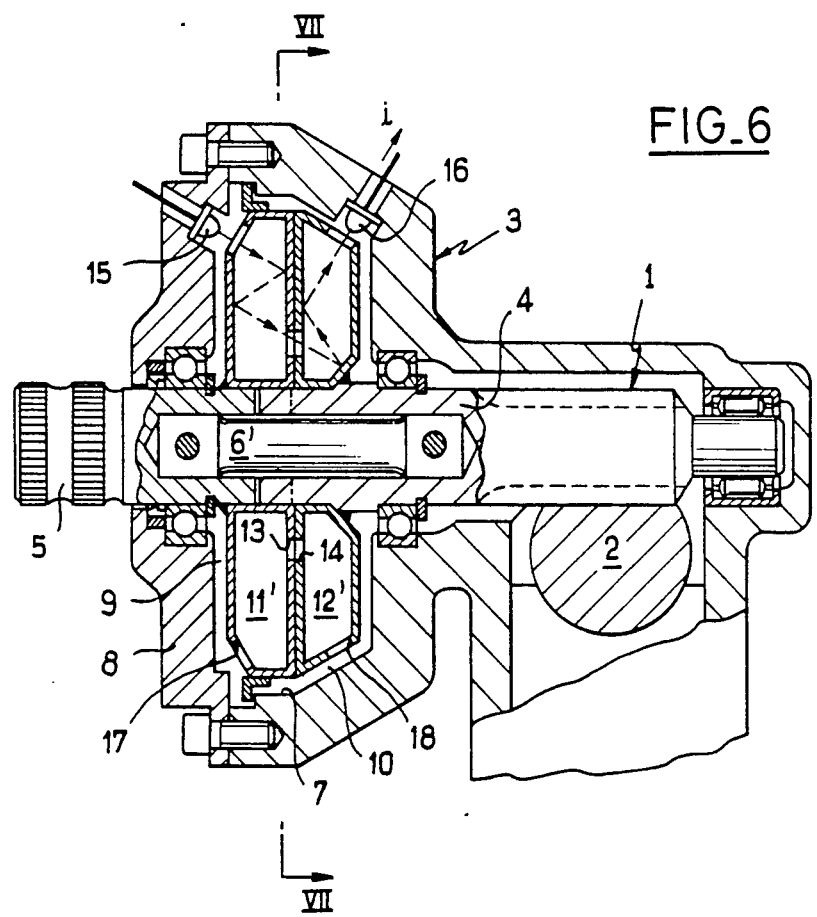
FIG_6
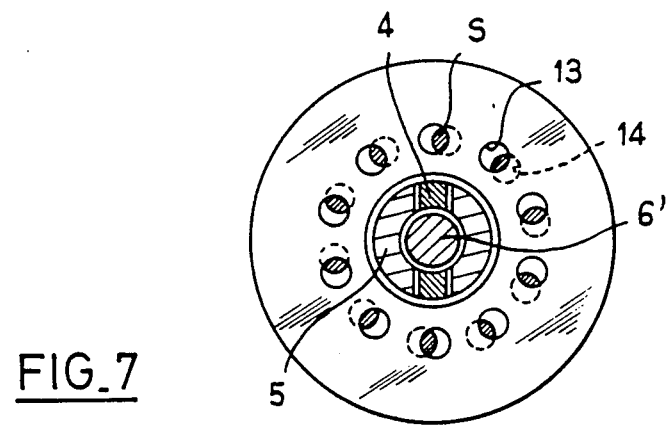
FIG_7

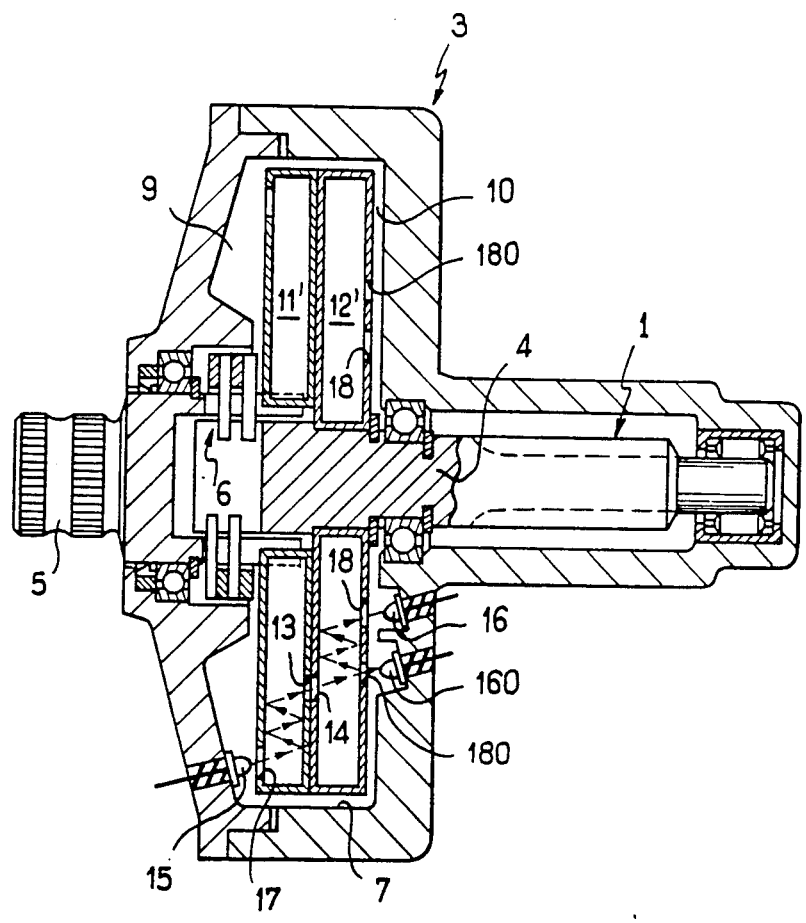
FIG_8

ELECTRO-OPTICAL TORQUE SENSING DEVICE FOR AN ACTUATING MECHANISM

The present invention concerns torque sensing devices for actuating mechanisms, particularly for the controls or for the steerable wheels of vehicles, the mechanism being of the type comprising, in a casing, a first rotary member intended to be connected to a control member, a secondary rotary member, which is coaxial with the primary member and is intended to be connected to an output member, and an elastic torsion member which co-operates with the primary and secondary members and allows relative rotation between the latter through a determined angular range on each side of a relative neutral position, and a sensor means which is sensitive to the relative rotation between the primary and secondary members in order to provide a corresponding electrical signal.

A torque sensing device of this type is described in the document EP-A No. 0,124,790, the torque detecting means comprising strain gauges mounted on the elastic torsion member which is constructed in the form of a torsion bar having a central cross-section in the shape of a strip. Such devices are subject to the well-known problems of positioning and fixing the strain gauges on their support and also raised problems relating to the electrical connections of these strain gauges. In addition, these devices require electrical processing circuits which are relatively sophisticated in order to ensure a minimum of reliability in operation.

It is an object of the present invention to provide a torque sensing device whose design is simple, which is robust and reliable, which is accurate in operation and offers a wide versatility of adaptation and use.

To achieve this, according to a feature of the invention, the sensor means comprises first and second rotary structures which are firmly rotatably fixed to the primary member and to the secondary member, respectively, and which comprise zones which are capable of rotating close to one another and relative to one another, each zone of each rotary structure comprising a series of optical windows which are angularly spaced and arranged in such a way that each window is capable of registering in a light path between a light source and at least one photo-electric detector of the proportional type, the windows of each series being arranged in such a way that, in the relative neutral position, two corresponding windows belonging to each series partially overlap in the light path.

Electro-optical measuring devices are indeed known, particularly in the field being considered, particularly from the document EP-A No. 0,115,381. The known devices enable the angular position and the angular speed of a rotating member to be measured, and simply consist of a transposition of the electromagnetic phonic wheel systems from the prior art providing the same functions. As a result, the known devices involve a single notched or masked disc which is firmly fixed to the control member of the actuating mechanism and also require electrical discriminating circuits in order to detect the direction of rotation of this control member.

In the arrangement according to the invention, the two rotary structures, which are typically constructed in the form of discs which are opaque or are rendered partially opaque, which are capable of relative rotation as is allowed between the primary and secondary members by the elastic torsion member, comprise, in the relative neutral position of these primary and secondary members, windows which partially overlap in the light path, thus providing the photo-electric detector with a master luminous flux independently of the exact configuration and of the exact positioning of these two windows. When the primary member is actuated in either direction, the master luminous flux is modified by being either reduced, or increased, thus providing, simultaneously, an indication of the direction of actuation of the control member and of the value of the torque exerted upon the latter. In addition, the passing of the windows in front of the light path also enables, in a conventional manner, the angular speed and position of this control member to be determined.

The invention will now be described by way of example with reference to the accompanying drawings, in which:

FIG. 1 is a longitudinal section of an actuating mechanism comprising a first embodiment of a torque sensing device according to the invention;

FIG. 2 is a diagrammatic view of a partial transverse section along the line II—II in FIG. 1;

FIG. 3 is a diagrammatic view of a partial transverse section along the section line III—III in FIG. 1;

FIG. 4 is an explanatory diagram of the output signal of the device shown in FIG. 1;

FIG. 6 is a view similar to that shown in FIG. 1, showing a third embodiment of the invention;

FIG. 7 is a diagrammatic view of a transverse section along the section plane VII—VII shown in FIG. 6;

FIG. 8 is a view similar to that shown in FIG. 6, showing a fourth embodiment of the invention.

In the description which follows and in the drawings, identical or similar members carry the same reference numbers, possibly primed or increased by an additional numerical digit.

Figure 5:
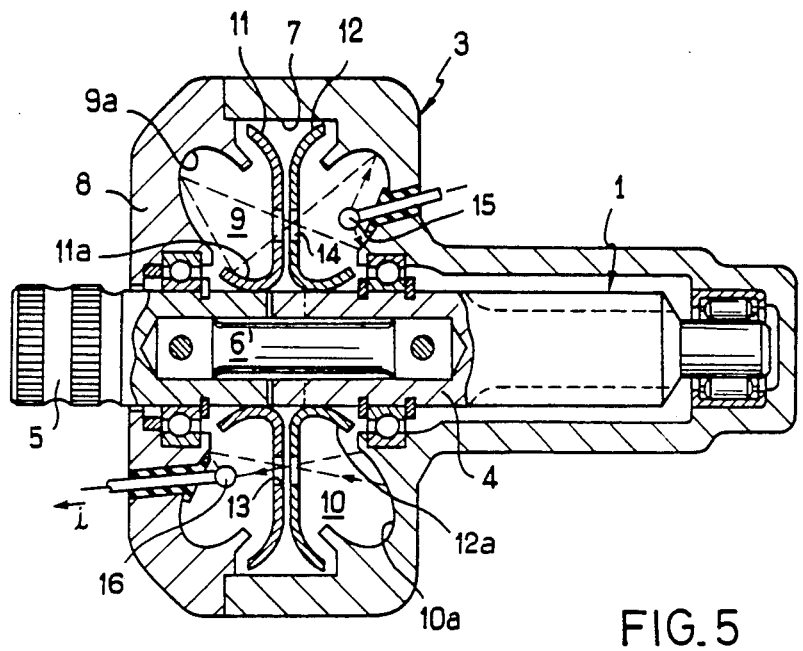
FIG. 5 is a longitudinal section similar to that shown in FIG. 1, showing a second embodiment of the invention.

FIG. 1 shows a torque sensing device according to the invention, applied to a co-operating assembly of a pinion (1) and a rack (2) in a steering box (3). In a conventional manner, the pinion (1), which meshes with the rack (2) connected to a mechanism for steering the wheels of a vehicle (not shown), is formed in a tubular output member (4) which is rotatably mounted in the casing (3) and is rotatably actuated, via a resilient coupling with dead travel, by a primary member (5), which is coaxial with the secondary member (4) and is rotatably mounted in the casing (3) in the axial extension of the secondary member (4), the primary member (5) being intended to be connected to a vehicle steering wheel (not shown). In the embodiment shown in FIG. 1, the resilient coupling with dead travel between the primary member (5) and the secondary member (4) consists of a set of C-springs (6) as described, for example, in the document EP-A No. 0,077,710 in the name of the Applicant Company. As is shown clearly in FIG. 2, the C-springs (6) comprise fingers which extend radially inwards through longitudinal slots formed in the secondary member (4) and which are housed in adjacent longitudinal grooves in the primary member (5).

In accordance with the invention, in the casing (3) there is defined a circular chamber (7), which is closed by a cover (8) is which the primary member (5) is journaled. A first disc (11) which is firmly fixed to the periphery of the primary member (5), and a second disc (12) which is formly fixed to the periphery of the adjacent end of the secondary member (4) are arranged in the chamber (7). In the embodiment shown, each disc in transverse section has a cross-section substantially in the shape of a C, the outside diameter of the discs being slightly smaller than the inside diameter of the chamber (7) so as to define in the latter two half-chambers (9 and 10) which are distinctly separated axially from one another. The discs (11) and (12), made of metal or of rigid plastic, are arranged in such a way that their flat radial web portions extend in the immediate vicinity axially of one another. In the full and opaque web portion of each disc (11 and 12) a series of windows (13, 14 respectively) is formed by stamping, the windows being angularly spaced on concentric rings, as shown clearly in FIG. 3. The number of windows (13 and 14) is preferably identical and they all have substantially the same dimensions. When the primary member (5) and the secondary member (4) are in their relative neutral position as defined by the elastic torsion member (6) forming the elastic coupling with dead travel between these two members, the discs (11 and 12) are angularly set on their respective members in such a way that each window (13) partially overlaps a corresponding window (14) thus defining a calibrated opening S for a light path between the two half-chambers (9 and 10).

In the embodiment shown in FIG. 1, a light source (15) and a photo-electric detector (16) are situated on the axial walls which face one another of the chamber (7) coaxially with the rings of the windows (13 and 14). The light source (15) is typically a light emitting diode (LED), which is mounted directly in the casing (3) or the end of an optical conduit extending in the corresponding half-chamber (9 or 10), the photoelectric detector (16) being of the proportional type and consisting, for example, of a photo-transistor which is mounted directly in the casing (3) or of the end of an optical conduit which opens into the corresponding half-chamber (10 or 9). With such an arrangement, when the primary member (5) and the secondary member (4) are in their relative neutral position, the passage cross-section S allows the photo-electric detector (16) to receive a master luminous flux. However, when the primary member is actuated in one direction or the other under the effect of the application of a torque onto this primary member, the disc (11) rotates, during a first stage, relative to the disc (12) within the angular range, which results in an increase or a reduction, according to the direction of rotation, in the passage cross-section S which results in turn in a corresponding increase or reduction of the luminous flux striking the photo-electric detector (16), thus providing an indication, firstly, of the direction of actuation of the primary member (5), and secondly, of the value of the torque exerted upon the latter against the elastic member (6). If, however, the torque exerted on the primary member (5) brings the latter to drive the secondary member (4) directily in rotation, the passing of the windows (13 and 14) across the light path between the source of light (15) and the photo-electric detector (16) allows the position and the angular speed of the primary member to be determined by counting, in a conventional manner. FIG. 4 shows, at p, the signal generated by the photo-electric detector (16) as a function of the relative actuation of the primary member (5) and the secondary member (4), t1 being the length of the light pulse which corresponds to the passing of an aperture S, and $t_2$ being the time between two such light pulses corresponding to the passing, across the light path, of two successive apertures S. If $t_1$ is smaller than or greater than $t_2/2$, it is thus possible to determine the direction of rotation of the primary member (5), its speed of rotation being a function of the time $t_2$. The rotary actuating torque of the primary member (5) may also be determined as a function of the ratio $t_1/t_2$.

The embodiment shown in FIGS. 5 and 6 is similar to that described above relating to FIG. 1, the elastic coupling member with dead travel between the primary member (5) and the secondary membner (4) in this case consisting of a torsion bar (6'), axial projections of one of these members being housed in axial grooves of greater width in the other of these member, as is also shown in FIG. 7. In the embodiment shown in FIG. 5, the axially opposite walls of the half-chambers (9 and 10) each have a toroidal shape whose transverse cross-section is essentially parabolic ($9_a$ and $10_a$); the opaque diss (11 and 12) comprise, as before, in their axially adjacent web portions, coincident windows (13 and 14), and each have a base portion ($11_a$, $12_a$, respectively), whose shape is toroidal and whose transverse cross-section is also essentially parabolic, in opposition to the parabolas ($9_a$ and $10_a$) of the half-chambers (9 and 10) and advantageously each has a reflective outer axial surface (that is to say facing the corresponding wall of the associated half-chamber) which is obtained, for example, by surface treatment. As in the embodiment shown in FIG. 1, the light source (15) and the photo-electric receiver (16) are each situated in a half-chamber (9 or 10) but in this case are positioned respectively at a focus of the corresponding half-chamber. With this arrangement, as shown in FIG. 5, the source (15) and the detector (16) are no longer aligned necessarily with the openings (13, 14) but advantageously are situated radially on each side of the primary (5) and the secondary (4) members. The different light paths through the different passage cross-sections S of the windows (13 and 14) resulting from the multiple reflections in the half-chambers (9 and 10) allow, for a determined power of the light source, greater luminous flux to be received by the photo-electric detector, and consequently a greater sensitivity of the device to be obtained.

In the embodiment shown in FIG. 6, the opaque discs of the previous embodiments are replaced here by thick discs (11' and 12') made of a translucent material, advantageously transparent, for example methyl polymethacrylate or similar. The external surfaces of the discs are coated with a layer of an internally reflective opaque coating for example a metallic deposit covered with an opaque compound. As in the preceding embodiments, the flat inner axial (that is to say adjacent) surfaces of the two discs lie in the immediate vicinity, axially, of one another and it is in the coatings of these inner surfaces that the windows (13 and 14) of the type described above are formed. However, formed in the outer axial surfaces (facing the corresponding walls of the associated half-chambers 9 and 10), in the coating of the discs, are annular transparent zones (17 and 18 respectively), facing which the light source (15) and the photo-electric detector (16) whose axes are inclined relative to the axis of the members 5 and 4, are situated. In this way, as shown in FIG. 6, the light beam coming from the light source enters at an angle, via the annular zone which is not coated (17, 18) of the associated disc, into the interior of the translucent disc where it is reflected several times by the internally rflective opaque coating until it passes through the coincident windows (13 and 14) so as to reach, after other reflections inside the other disc, the annular zone which is not coated of this other disc, and thus the photo-electric detector. In the embodiment shown in FIG. 6, the annular zones which are not coated (17, 18) of the discs (11', 12') are formed on a peripheral ring of each disc which is inclined relative to the plane of the disc, the light source (15) and the photo-electric detector (16) being mounted in the casing (3) and its cover (8) along axes which are perpendicular to these inclined rings.

The embodiment shown in FIG. 8 is similar in most respects to that described above relating to FIG. 6. In the embodiment shown in FIG. 8, the translucent discs (11' and 12') each have a rectangular cross-section, the annular zone which is not coated (17) in the outer axial surface of the disc adjacent to the light source (15) is formed at the periphery of this outer axial surface lying radially, the other annular zone which is not coated (18) and is adjacent to the photo-electric detector (16) is arranged, in the outer axial surface of the other disc, on the output portion of the reflected light path in this other disc (12') after having passed through the windows (13 and 14), the axes of the source (15) and of the detector (16) being inclined relative to the axis of the members (5) and (4). In the embodiment shown in FIG. 8, the outer axial surface of the other disc (12') also comprises a second annular zone which is not coated (180) which is in line with the portion of the light path coming directly from the window (13 and 14), a second photo-electric detector with an inclined axis (160) being situated in the region of this second annular zone (180). As before, the first detector (16) is used to measure the torque applied to the primary member (5) while the second photo-electric detector (160), receiving the light coming directly from the slots (13 and 14) through the second disc (12'), is used to detect the speed of rotation of the primary member (5)/secondary member (4) assembly, by means of its own processing circuit. It will be noted that in this embodiment shown in FIG. 8, the elastic device for coupling in rotation with dead travel (6), in the form of a series of C-springs, is situated on the same side as the primary member (5) relative to the discs (11' and 12') in contrast to the arrangement described relating to FIG. 1 in which the elastic member (6) was situated, relative to the discs (11 and 12), on the same side as the secondary member (4).

Figure 9:
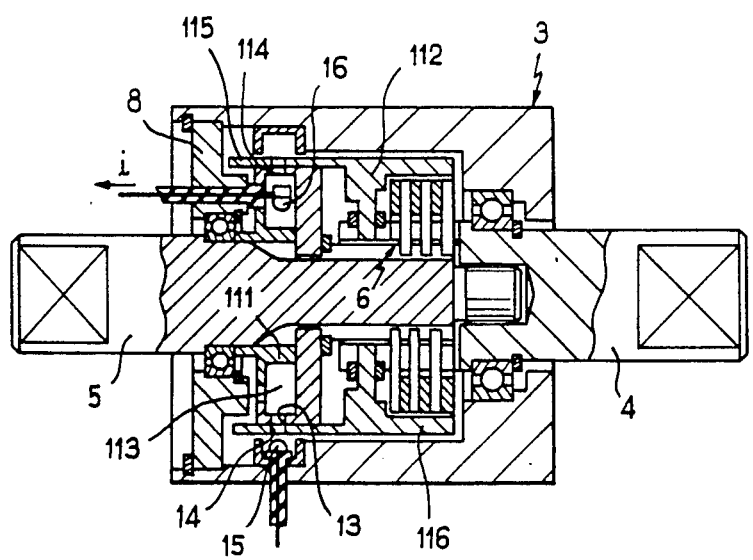
FIG. 9 is a longitudinal section of a fifth embodiment of a torque sensing device according to the invention.

In the embodiments described above, the optoelectrical device for detecting torque is situated in the region of the steering box enclosing the pinion (1)/rack (2) assembly. This device may however be situated at any point in the kinematic chain between a steering wheel and an output member, for example in an intermediate zone of a steering column. Such an embodiment is shown in FIG. 9 in which the secondary member (4) is intended to be connected to a lower portion of such a steering column. In order to maintain in this case an overall size of the device which is relatively limited, the rotating structure, which is firmly rotatably fixed to the primary member (5) consists in this case of an annular member (111) which defines a toric inner chamber (113) which is defined peripherally by a tubular wall (114). The other rotating structure which is firmly fixed to the secondary member (4) is constructed in the shape of a tubular member (112) which comprises a tubular axial wall (115) which surrounds concentrically the wall (114) of the first rotating structure (111), the co-operating windows (13 and 14) being formed, radially in line, in these coaxial walls (114 and 115). As shown in FIG. 9, the light source (15) is advantageously situated in an outer annular trough which faces inwards towards the windows (13 and 14), photoelectric detector (16) being situated inside the toric chamber (113). In the embodiment shown, the second rotating structure (112) advantageously comprises a second tubular axial extension (116) which is opposite the wall (115) and which surrounds the set of C-springs of the elastic coupling member with dead travel (6).

Although the devices described above are intended for the control of servo steering systems with an electric assistance motor or with hydraulic assistance with control pilot electro-valves they are not limited by them but are capable of other uses, for example for the control of electrical aircraft steering or in machine tools.

I claim:

1. A torque sensing device for an actuating mechanism, particularly for the steering or the steerable wheels of a vehicle, the mechanism comprising, in a casing, a primary rotary member which is intended to be connected to a control member, a secondary rotary member which is coaxial with said primary member and intended to be connected to an output member, an elastic torsion member which cooperates with said primary and secondary members and allows relative rotation between the latter through a determined angular range on each side of a relative neutral position, and sensor means which is sensitive to the relative rotation between said primary and secondary members so as to provide a corresponding electrical signal, characterized in that the sensor means comprises first and second rotating structures which are rotatably fixed to said primary member and secondary member, respectively, and which comprise zones which are capable of rotating in the vicinity of one another and relative to one another, each zone of each rotating structure comprising a series of optical windows which are angularly spaced and arranged in such a way that each window is capable of crossing a light path between a light source and at least one photo-electric detector of proportional type, said windows of each series being arranged in such a way that in said relative neutral position two corresponding windows each belonging to respective series partially overlap in said light path, the rotating structures comprising two discs which are parallel and axially adjacent, said discs situated in a chamber of said casing, said light source and detector communicating optically with opposite axial zones, respectively, of the chamber, each disc made of a translucent material and comprising an outer axial surface and an inner axial surface which are coated with a layer of an internally reflective opaque coating, said inner axial surfaces of said two discs being adjacent, said windows being formed in said coating of said inner axial surfaces, and said outer axial surfaces each having an annular zone which is not coated and which is adjacent the respective zone of said chamber.

2. The device according to claim 1, characterized in that at least a portion of said light path coming from said light source toward said first disc is at an angle relative to an axis of said primary and secondary members.

3. The device according to claim 2, characterized in that the annular zone which is not coated of said outer axial surface of said second disc is arranged on an output portion of said light path which is reflected in the second disc.

4. The device according to claim 3, characterized in that said second disc comprises on the respective outer axial surface a second annular zone which is not coated and in line with a portion of said light path passing through the corresponding windows of said discs, a second photo-electric detector being situated adjacent the second annular zone.

5. The device according to claim 2, characterized in that at least said annular zone which is not coated of said first disc is formed on a ring of the first disc which is inclined relative to a plane of the first disc.

6. The device according to claim 1, characterized in that said elastic torsion member is a torsion bar.

7. The device according to claim 1, characterized in that said elastic torsion member consists of at least one C-spring.

* * * * *